May 29, 1956        B. S. SAVIN, JR        2,747,367

GAS TURBINE POWER PLANT SUPPORTING STRUCTURE

Filed March 21, 1950        6 Sheets-Sheet 1

May 29, 1956     B. S. SAVIN, JR     2,747,367
GAS TURBINE POWER PLANT SUPPORTING STRUCTURE
Filed March 21, 1950     6 Sheets-Sheet 6

Inventor
Bennett S. Savin Jr.
by Charles A. Warren
Attorney

United States Patent Office 2,747,367
Patented May 29, 1956

2,747,367

GAS TURBINE POWER PLANT SUPPORTING STRUCTURE

Bennett S. Savin, Jr., Wethersfield, Conn., assignor to United Aircraft Corporation, East Hartford, Conn., a corporation of Delaware Application March 21, 1950, Serial No. 150,858

8 Claims. (Cl. 60—39.16)

In multistage, axial flow compressors, it has been found advantageous to split the compressor and have one part (generally several stages) driven by one or more turbine stages with the remaining compressor stages independently driven by the remainder of the turbine stages. This results generally in a construction in which an outer spool or high pressure unit, consisting of the last few high-pressure compressor stages connected to and driven by the high-pressure stage or stages of the turbine, surrounds and rotates on an axis concentric to the inner spool or low pressure unit. The latter consists of the remainder of the compressor stages driven by the remaining turbine stages. A feature of this invention is the support of the outer spool within the supporting structure to provide for rotation independently of the low pressure unit. Another feature is the independent support of each unit from the supporting structure in such a manner that either unit may be separately mounted and rotated within the supporting housing as, for example, in testing each separate unit for balance.

One feature of the invention is the drive of the propeller system from one of the units leaving the other unit free to set its own speed of rotation. Another feature is an arrangement of a brake for holding one of the units stationary while the other is operating as, for example, while starting and warming up the power plant. The brake also serves to prevent windmilling of the propeller while maneuvering on ground or carrier deck.

With a divided power plant of this type, it is possible to start it by cranking only one of the units with the other unit held stationary or, in certain cases, with the other unit allowed to rotate freely under the influence of the flow of gas through the compressor and turbine. A feature of this invention is the arrangement of the starting drive for the outer spool or high pressure unit independently of the other unit.

In mounting a hot gas turbine within a surrounding housing, it is necessary to allow for substantial relative expansion between the turbine casing and its supporting housing by reason of the high differential thermal expansion and the different operating temperatures. The use of radially extending supporting pins for the turbine casing is old in the Soderberg and Clark Patent No. 2,453,547, issued November 9, 1948, in which the casing is free to expand radially and axially within the supporting housing. A feature of this invention is an alternative supporting structure in which the pins are omitted and which still permits the relative expansion and contraction between the housing and the supporting casing. Another feature is the use of the supporting structure as a dividing wall in the power plant to eliminate the necessity of a seal between the turbine casing and the surrounding housing. This wall also permits the application of compressor pressure externally of the casing to minimize the pressure differential to which the turbine casing is subjected.

Other objects and advantages will be apparent from the specification and claims and from the accompanying drawings which illustrate an embodiment of the invention.

Figure 1:
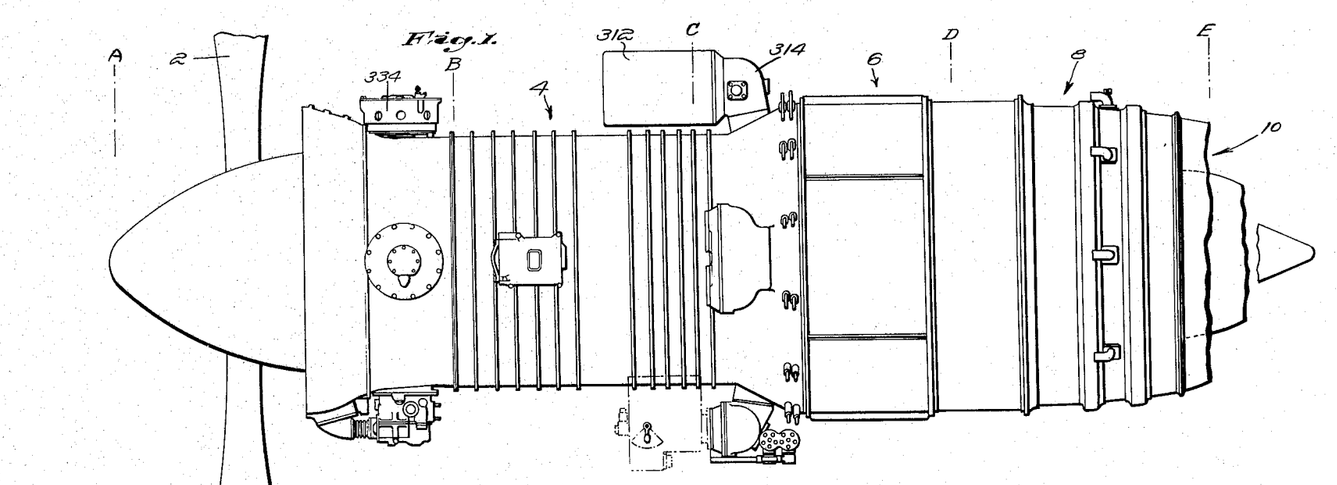
Fig. 1 is a side elevation of a power plant with parts broken away.

The power plant, as shown, consists of a multistage, axial flow compressor consisting of two separate sections, the high-pressure section of which is driven from the first turbine stage and is mounted to rotate on the same axis as the rest of the compressor but independently of it. The low pressure compressor section and the propeller are driven from the remaining turbine stages. Referring first to Fig. 1, the propeller 2 is mounted at the forward end of the power plant and may have a ducted spinner inlet by which air enters the compressor 4. The air flows axially through the compressor and thence into the burner or combustion chamber section 6 where it is heated by burning fuel therein. Gas from the burner section is discharged into the turbine 8, from which the gas exhausts through a thrust nozzle 10.

Figure 2:
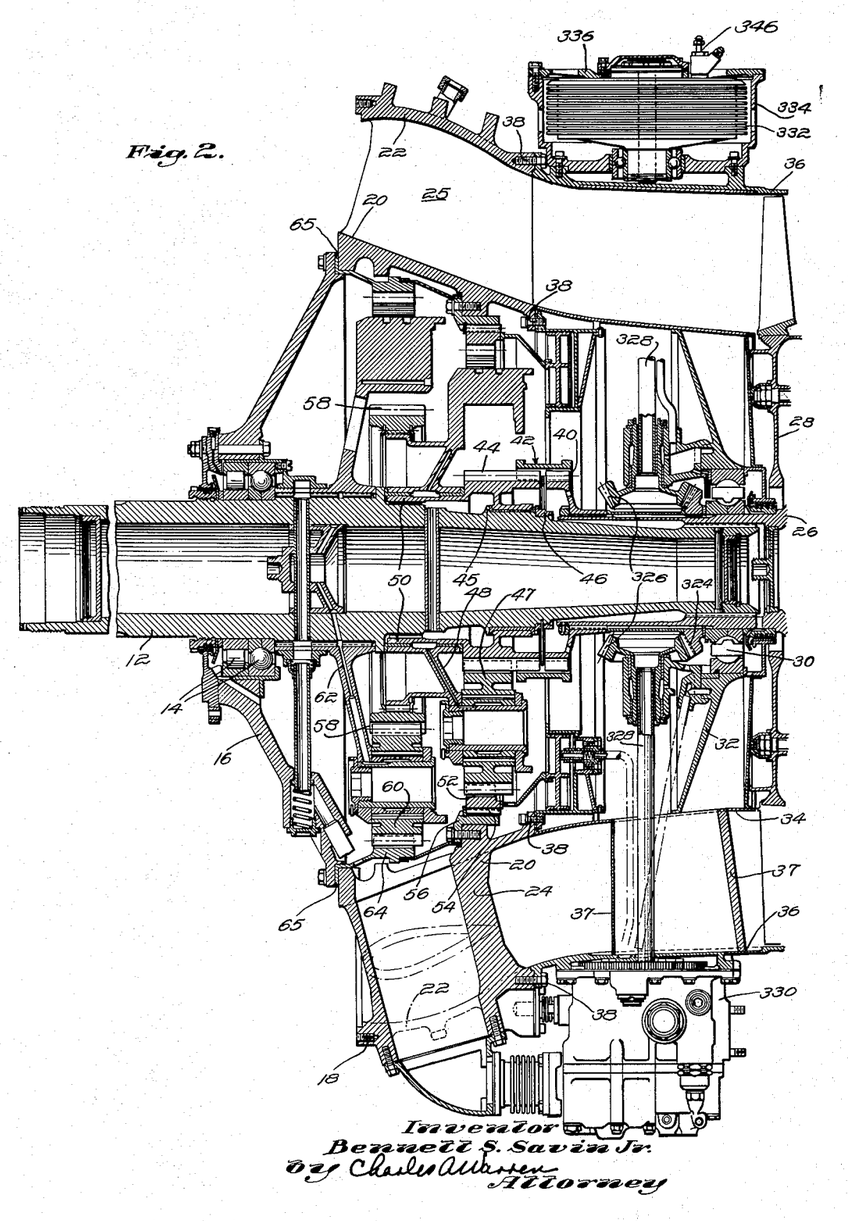
Fig. 2 is a sectional view of the reduction gear and the compressor inlet located approximately between the lines A and B of Fig. 1.

The propeller is driven through a reduction gear drive, best shown in Fig. 2. The propeller shaft 12 is journalled in bearings 14 carried by plate 16 supported at its outer edge by a frame element 18 consisting of inner and outer rings 20 and 22 spaced apart by integral vanes 24 to form an annular inlet 25 for the compressor. The propeller shaft is journalled at its rearward end within the end bell 26 of the first or low pressure compressor section 28. The end bell 26 is, in turn, journalled in a bearing 30 supported by a plate 32 which engages at its outer edge with the inner sleeve 34 of a pair of sleeves 34 and 36 which form a continuation of the compressor inlet passage 25 and which are spaced apart by a number of vanes 37. The forward ends of the sleeves 34 and 36 are fastened as by bolts 38 to the rings 20 and 22, respectively. The plates 16 and 32 and the ring 20 and sleeve 34 form an enclosure for the reduction gear.

For the propeller drive, the forward end of the end bell 26 is splined to a gear 40 connected, as by a loose-splined ring 42 to a gear 44 journalled on the propeller shaft 12. The gear 44, which is supported against axial movement on the shaft 12, having its hub clamped between a shoulder 45 and a clamping ring 46, forms the sun gear of a planetary reduction gear assembly and meshes with a series of pinions 47 carried by a cage 48 journalled on a projecting hub 50 on the sun gear 44. The pinions 47 are also in mesh with a ring gear 52 having on its outer surface helical splines 54 engaging with cooperating splines in a ring 56 secured to the inner ring 20. The helically splined ring gear 52 forms a part of a torquemeter, hereinafter described, the ring gear 52 being effectively stationary within its housing which consists of the ring 20 and the sleeve 34.

The cage 48 has splined thereon a gear 58 which forms the sun gear of a second planetary reduction gear assembly and is concentric to the axis of the propeller shaft. Gear 58 meshes with a series of pinions 60 carried by a cage 62 which is splined to the propeller shaft. The pinions 60 mesh with a ring gear 64 which has an integral flange 65 clamped between the outer edge of plate 16 and the frame element 18 for holding the gear 64 in position. By this arrangement of gearing, the compressor rotor speed is stepped down to a suitable propeller speed by means of two stages of planetary gearing as will be apparent, the reduction in speed being accomplished in a small space.

Figure 3:
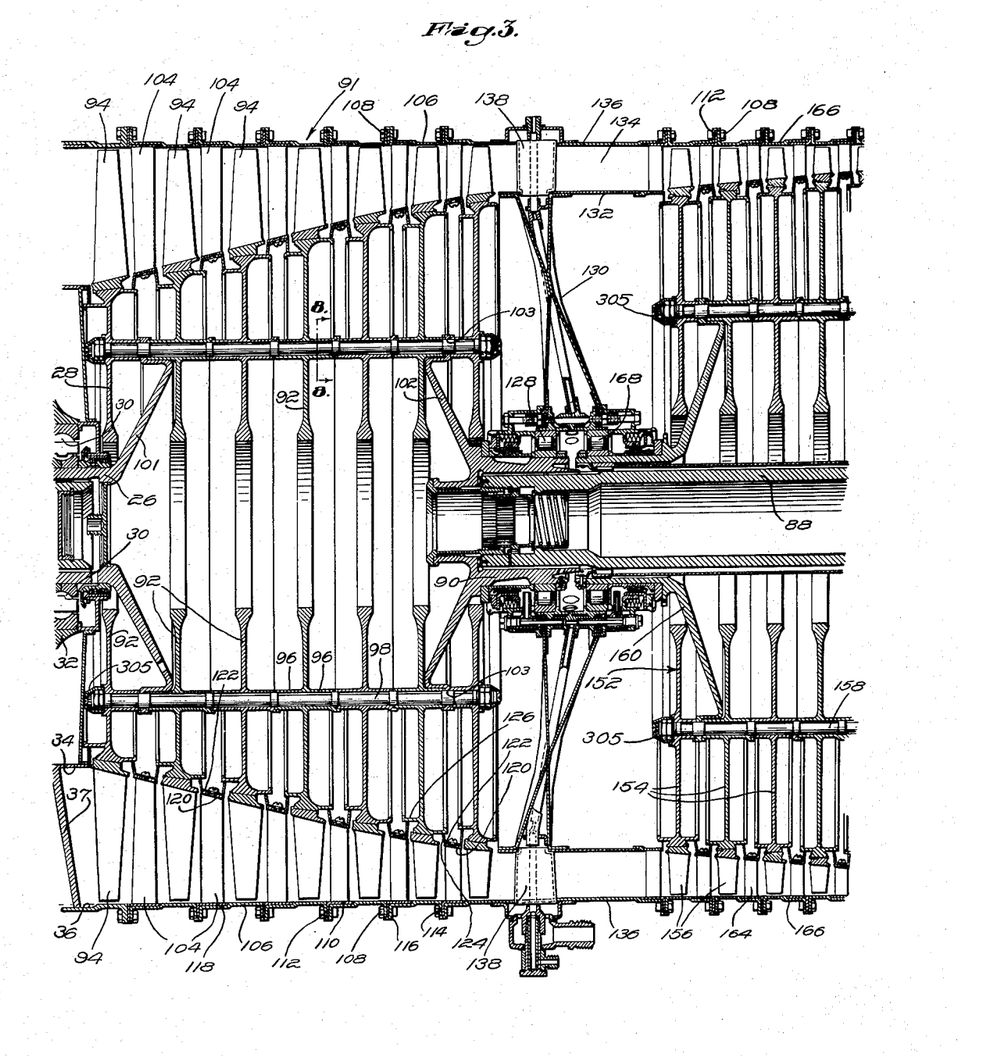
Fig. 3 is a sectional view on the same section as Fig. 2 of the main part of the compressor substantially between the lines B and C of Fig. 1.
Figure 4:
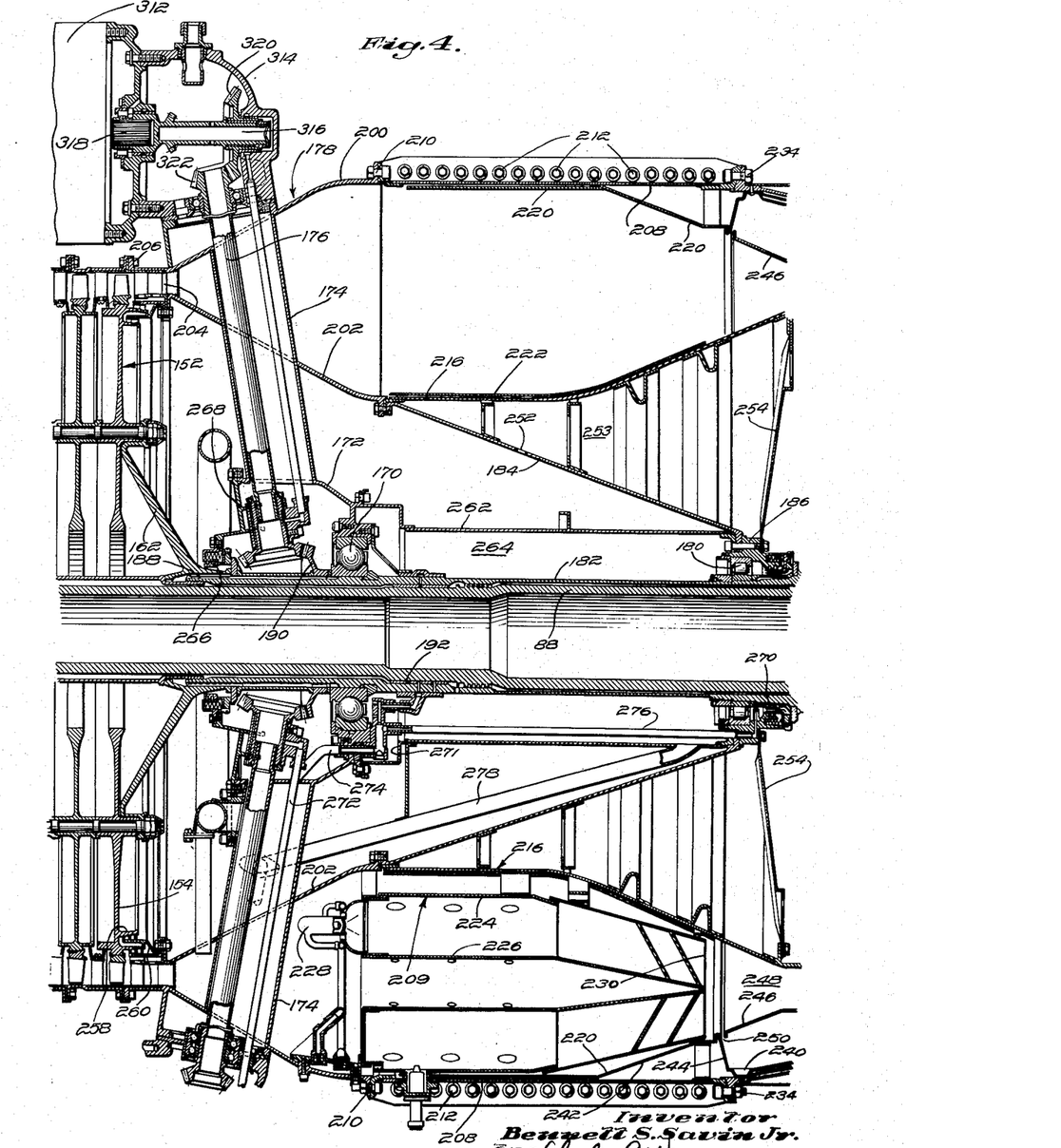
Fig. 4 is a sectional view on the same scale as Figs. 2 and 3 of the compressor discharge and the combustion chamber configuration substantially between the lines C and D of Fig. 1.
Figure 5:
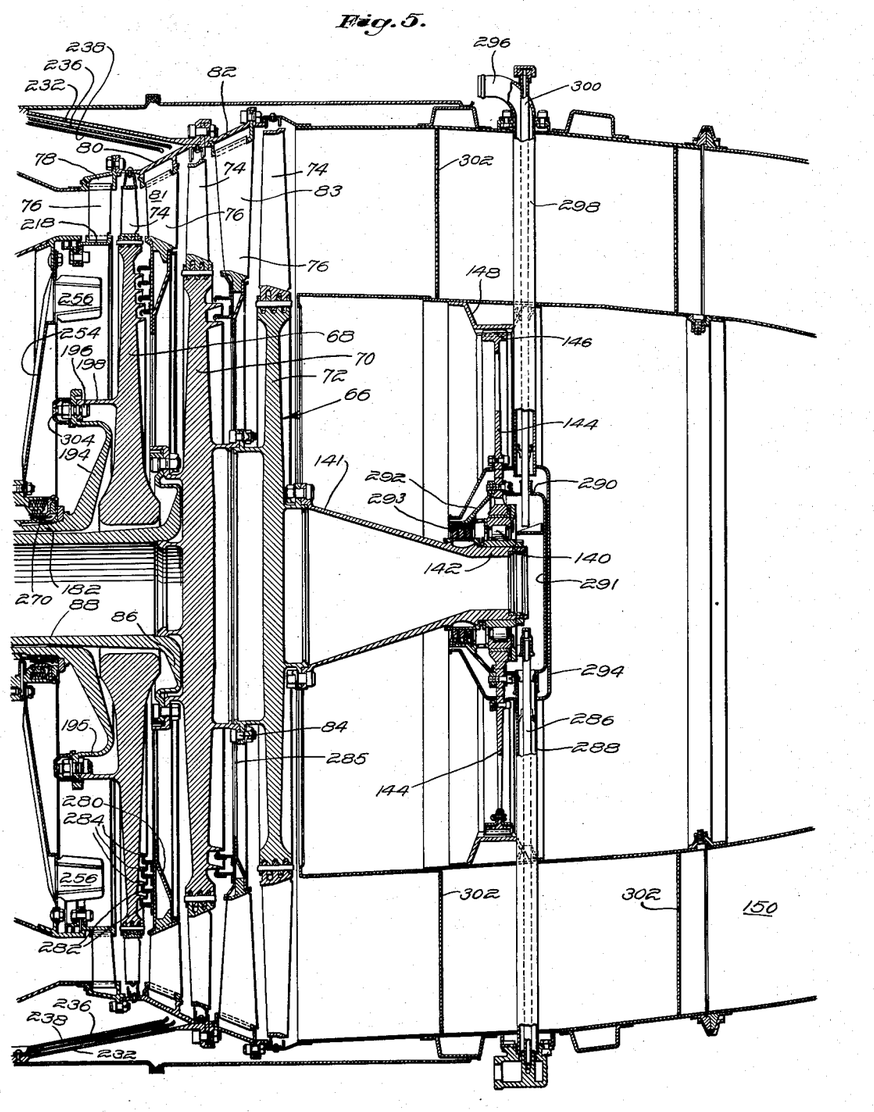
Fig. 5 is a sectional view of the turbine structure substantially between the lines D and E of Fig. 1.

As above stated, the propeller shaft is driven by the low pressure section 66 of the turbine which includes the second and third turbine stages. With reference to Fig. 5, the turbine which consists of three stages, has turbine discs 68, 70 and 72 carrying blades 74 on their peripheries which alternate with rows of stationary vanes 76 carried by casing rings 78, 80 and 82, respectively. The second and third stage discs 70 and 72 are bolted together as at 84 and the upstream side of the second stage disc 70 is bolted to a radially extending flange 86 on a shaft 88 which extends forwardly from the turbine section of the power plant through the burner section as shown in Fig. 4 and through the high-pressure section of the compressor as shown in Fig. 3. The forward end of the shaft 88 has splined thereto the end bell 90 for the rotor of the low pressure section 91 of the compressor, which is also driven by the low pressure turbine stages.

Figure 8:
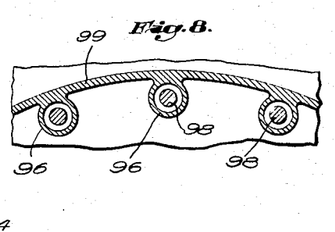
Fig. 8 is a sectional view substantially on line 8—8 of Fig. 3.

Referring now to Fig. 3, the rotor of the low pressure section of the compressor consists of a number of rotor discs 92, each having a row of blades 94 on its periphery and each having rings of projecting tubular bosses 96 on opposite sides thereof which receive through bolts 98 and which engage end to end for spacing the discs apart. The bosses 96 are tangential to an integral annular flange 99, Fig. 8, which cooperates with the adjoining flange on the adjacent disc to form a cylindrical sleeve extending between adjacent discs. The end bell 26 at the upstream end of the low pressure rotor and the opposite end bell 90 as shown, have outwardly extending flanges 101 and 102, respectively, which engage between the bosses 96 of the outermost compressor discs and the discs adjacent thereto thereby supporting the row of discs in proper relation within the power plant. The outer peripheries of the flanges 101 and 102 have rows of openings 103 to receive the through bolts 98 and hold the end bells in proper relation to the discs. It may be noted that by having the end bells located axially inwardly of the outermost compressor discs the overall length of the rotor may be materially shortened.

Figure 6:
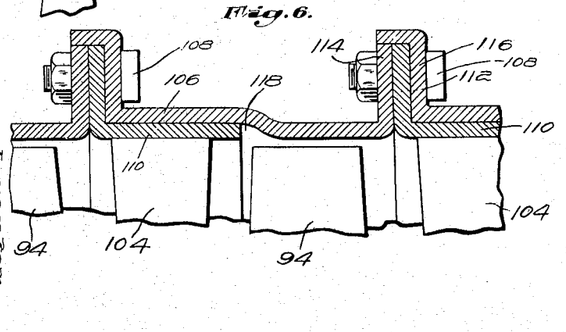
Fig. 6 is a sectional view of a detail of the compressor housing assembly.

The successive rows of blades 94 on the compressor discs alternate with rows of stationary vanes 104 which are supported and axially spaced by surrounding casing rings 106, the latter being arranged in abutting relation and being secured together as by bolts 108 in building up the compressor casing. The vanes 104 are mounted at their outer ends on semi-annular plates 110, Fig. 6, each plate having a radially extending flange 112 fitting between the adjacent flanges 114 and 116 on the casing rings. It will be noted that each casing ring 106 has a recess 118 therein to receive the vane carrying plates 110 so that when the vanes and the plates have been assembled within the casing rings, the inner wall of the casing, which defines the gas path, is substantially smooth.

Figure 7:
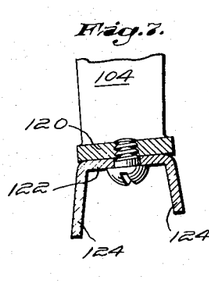
Fig. 7 is a sectional view of a detail of the compressor vane assembly.

The inner ends of the stator vanes 104 in each row are interconnected by a split ring 120, Fig. 7, to which is also secured a sealing member 122 having spaced flanges 124 extending radially inward and engaging with laterally projecting flanges 126 on the compressor discs. It will be noted that the flanges on opposite sides of each compressor disc are not necessarily in axial alignment since by selecting suitable diameters for the flanges 126, it is possible to control the area of the disc that is exposed to the interstage gas pressure thereby making possible the control and balancing of the total end thrust on the compressor section. The flanges 126 also serve to stiffen the discs against axial bending resulting from uneven pressure loading on the discs.

The low pressure compressor rotor is supported at the inlet end by the bearing 30, above described, and at its downstream end by a bearing 128 carried by a supporting web 130 extending inwardly from a ring 132 which forms the inner wall of the annular gas path 134 between the low pressure compressor section and the high pressure compressor section. The ring or sleeve 132 is supported within a substantially parallel outer ring 136 by struts 138 which may be hollow for the purpose of supplying lubricant to the bearing 128 and for scavenging the oil therefrom. The outer sleeve 136 is connected to and forms a continuation of the compressor casing as will be apparent.

Referring now to Fig. 5, the second and third turbine stages which drive the low pressure compressor section are supported by a bearing 140 located downstream of the turbine discs. As shown, the last turbine disc 72 has an annular flange 141 with a stub shaft 142 mounted thereon. The outer end of the shaft 142 is supported by the bearing 140. The bearing is supported within a spider 144, the outer periphery of which has a spline connection 146 to a ring 148 supported within the annular exhaust duct 150 for the turbine. The spline connection permits radial expansion of the supporting ring with reference to the spider.

The three spaced bearings 30, 128 and 140 support the low pressure compressor rotor and its driving low pressure turbine section for rotation within the power plant independently of the remainder of the rotating parts. That is to say, in the testing or assembly of the overall power plant, it is possible to assemble the low pressure compressor and turbine sections, above described, and run them within the supporting structure without the necessity for mounting the outer or high pressure spool, which consists of a compressor section and the first turbine stage, hereinafter described.

Referring now to Figs. 3 and 4, the outer spool includes the high pressure compressor section, the rotor 152 of which is made up of a number of separate discs 154 each having on its periphery a row of blades 156. The compressor discs are assembled in the same manner as the compressor discs of the low-pressure section, being held together by a through bolt 158 which also secures the discs to the end-bells 160 and 162. The blades 156 of the several stages alternate with rows of stationary vanes 164 which are secured in place in a manner similar to the vanes 104 of the low pressure section. The casing rings 166 of the high pressure section form a continuation of the low pressure casing and the sleeve 136 and define the outer wall of the gas path through the compressor.

The upstream end of the rotor 152 is supported by a bearing 168 mounted within the same supporting web 130 that carries the bearing 128. At the downstream end of the compressor section, the rotor is supported by a bearing 170 which is carried by a bearing housing 172. The housing is held in position by radially extending struts 174 through which accessory drive shafts 176 extend, as will be later described. The outer ends of the struts are integral with or positively connected to the diffuser element 178 which extends from the discharge end of the compressor to the combustion chamber or chambers in which fuel injected into the airstream is burned.

Another bearing 180 located adjacent to the first turbine disc 68 engages with the driving sleeve 182 which extends between and connects the disc 68 and the rotor 152. The bearing 180 is supported in position by a frusto-conical frame member 184 extending from the diffuser element 178, the bearing being mounted within a mounting ring 186 at the smaller end of the conical member.

The sleeve 182 is splined at its forward end to mesh with cooperating splines 188 on the end-bell 162. A gear 190 is also splined to the shaft 182 adjacent to the bearing 170 for driving accessories, as will be pointed out. The sleeve 182 surrounds the shaft 88 and, if desired, there may be a bearing 192 provided between the sleeve and the shaft at a point adjacent to the bearing 170. At its downstream end, the sleeve 182 has a radially extending flange 194, Fig. 5, the outer rim of which is secured as by bolts 196 to a flange 198 on the turbine disc. The outer rim of the flange is connected to the rest of the flange 194 by a flexible cylindrical portion 195. The bearings 168, 170 and 180 support the compressor rotor 152, the first turbine disc, and the connecting shaft 182 in such a manner that this part of the power plant may be assembled and tested within the supporting structure without the necessity for incorporating in the assembly the low pressure compressor section or the second and third turbine stages.

The combustion chambers in which fuel is burned between the compressor and turbine form the subject matter of a copending Highberg application Serial No. 150,973 filed March 21, 1950, now Patent No. 2,674,090. For the purpose of this application, it is sufficient to note that the diffuser element 178 consists of an outer ring 200 and an inner ring 202, the upstream ends of which are held in spaced relation to each other by straightening vanes 204. The outer ring 200 has a flange 206 by which the diffuser is connected to the downstream end of the compressor casing. The rings 200 and 202 diverge in the direction of airflow to form the diffuser passage and the supporting element 184 is connected to the downstream end of the inner ring 202. A burner casing 208 surrounds the burners or combustion chambers 209 and is connected at its upstream end to the downstream end of the ring 200 as by bolts 210. Although the casing 208 may be a single cylindrical element, it is shown here as made up of several flanged segments held together as by bolts 212.

Spaced radially inward from the casing 208 is a sleeve 216 forming the inner wall of the burner duct, this wall being connected at its upstream end to the ring 202 and its downstream end engaging with a supporting ring 218, Fig. 5, for the inner ends of the nozzle vanes 76 for the first turbine stage. A heat shield 220 lines the casing 208 and another heat shield 222 lines the sleeve 216, both shields being spaced from the adjacent part to permit a flow of cooling air therethrough.

The casing 208 with its heat shields 220 is positioned in spaced relation to the sleeve 216 and defines therebetween an annular path for gas between the compressor and the turbine. Within this annular path are located the burner cans or combustion chambers 209 which, in the arrangement shown, consist of concentric sleeves 224 and 226 open at their upstream end to receive fuel from nozzles 228 and converging at the downstream end to form a smaller annular discharge opening 230 for the gas as it approaches the turbine.

The turbine nozzles, Fig. 5, are supported from the downstream end of the casing 208 by a ring 232 held at one end as by bolts 234, to the casing 208 and, at the downstream end bolted to the flange connection between the second and third stage turbine nozzles, as well be apparent. The arrangement of this ring, which is frusto-conical in the construction shown, is such that the turbine casing can expand without being misaligned with respect to the compressor and burner cases. Heat shields 236 and 238 are located in spaced parallel relation to the ring, and between the ring and the burners. The inner shield 238 is open at its forward end with the exception of spacing lugs 240 thereon so that air flowing through the combustion chamber externally of the sleeve 224 may flow through holes 242 in the heat shield 220 to enter the space between the innermost shield 238 and the adjacent shield 236.

The attachment of ring 232 to the turbine casing between the second and third stage nozzles provides a relatively cool point of attachment as contrasted to the temperature of the first stage nozzle. Moreover, the ring 232 acts as a seal between the casing and the surrounding structure to maintain, in the chamber surrounding the first and second stage nozzle, the compressor discharge pressure so that the pressures inside and outside of the nozzle rings are substantially balanced and the first stage nozzle is not subjected to any unbalanced pressures tending to burst the nozzle ring. It will be further noted that the flow of cooling air is from the cool outer end of the ring 232 to the hot inner end, such that the ring may adjust itself by thermal changes to the thermal expansion of the casing.

The innermost shield 238 carries at its forward end an inwardly extending flange 244 which at its inner end is in alignment with the downstream end of the heat shield 220 thereby guiding the flow of cooling air from around this shield into the space between the turbine shields. The inner edge of the flange 244 is axially spaced slightly from the wall 246 forming the outer wall of the turbine inlet duct 248. This spacing defines a passage 250 through which cooling air from the shields flows into the inlet duct and travels along the inside surface of the wall 246 to prevent overheating.

The innermost shield 238, as above stated, is spaced from the adjacent shield 236 so that cooling air from the combustion chamber flows between these two shields. This cooling air discharging at the open downstream ends of the shields is directed against the outside surface of the turbine casing adjacent to the point of attachment of the supporting ring 232. From this point, the cooling air flows forwardly over the casing rings 80 and 78 and thence along the outer surface of the wall 246 to enter the passage 250.

To prevent overheating of the bearings 170 and 180, Fig. 4, cooling air from the compressor circulates through the chamber enclosed by the inner wall 202 of the diffuser and also inwardly of the supporting frusto-conical member 184. The member 184 has holes 252 through which the cool air flows into the space 253 between the combustion chamber wall 216 and the member 184. The downstream end of this space may be closed by a diaphragm 254 which may have nozzles 256, Fig. 5, mounted thereon for guiding the air flowing through the cooling spaces against the first stage turbine disc adjacent its periphery. It may be noted in connection with the cooling air that the last compressor disc has radially spaced flanges 258 each of which is engageable by sealing elements 260 carried by the wall 202 which control the amount of compressed air escaping at this point for use in cooling.

Since the bearings 170 and 180 must be lubricated, they are enclosed within the support 172 and the mounting ring 186 and by a sleeve 262 extending between the mounting ring and support. This sleeve 262 surrounds the shafts 88 and 182 to define a chamber 264 which encloses the bearings and interconnects them. The chamber 264 is closed at its forward end by a suitable seal 266, a part of which is carried by the cover plate 268 for the upstream end of this chamber. The lower end of the chamber is closed by a seal 270. The sleeve may have an offset 271 therein to allow for axial expansion.

Lubricant is supplied through a lubricant inlet pipe 272 located in one of the vanes 174 and by-pass pipes 274 and 276 leading to the bearing. The chamber 264 is scavenged through a duct 278 connected to a scavenge pump, not shown.

The space upstream of the first stage turbine disc between the disc and the diaphragm 254 is closed by the seal 270 so that it becomes unnecessary to provide other seals to control leakage of power fluid from the space between the first stage nozzle and the cooperating blades on the first turbine disc. Between the first and second discs, however, it is necessary to prevent leakage around the inner end of the diaphragm for the second stage nozzle. To this end the second stage nozzle 81 carried by casing ring 80 has an inwardly projecting diaphragm 280 carrying sealing fingers 282 engaging with sealing flanges 284 on the side surface of the first stage disc. It will be apparent that by selecting the particular radial position of the flanges 284 and the cooperating fingers with reference to the radius of the first stage disc, it is possible to determine the area of the first stage disc that is exposed to the high pressure at the inlet side of the second stage nozzle. Thus, the only area of this disc exposed to the high pressure at this point is the disc surface radially outward from the sealing flanges. The remainder of the first stage disc is exposed to the lower pressure existing at the downstream end of the second stage nozzle.

A similar sealing arrangement is provided between the second and third turbine stages by a diaphragm 285 on the inner periphery of the third stage nozzle 83. In this way, by selecting the area of the discs exposed to the high pressure, it is possible to control the amount of axial thrust exerted on the turbine rotor assemblies by the pressures existing in the turbine.

Figure 9:
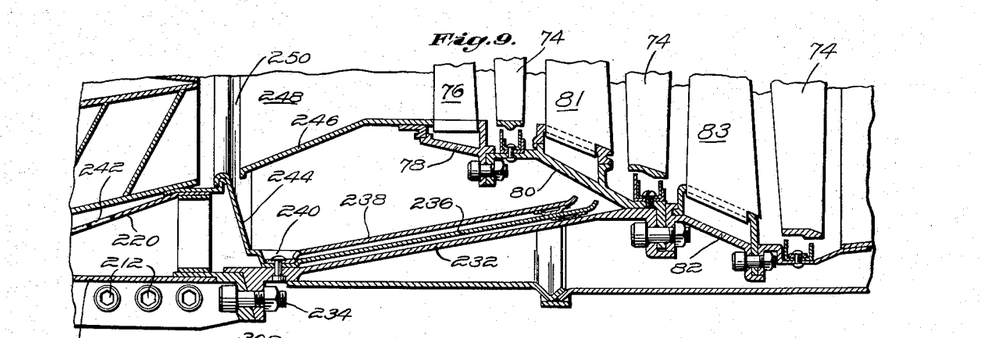
Fig. 9 is a fragmentary sectional view of the turbine mounting.

Lubrication for the bearing 140 is provided by a lubricant pipe 286 extending through a radially extending shielding tube 288 to a housing 290 surrounding the bearing 140. The housing is in two parts, the downstream part 291 being cup-shaped and attached to the plate 144. The other part 292 is on the upstream side of plate 144 and at its upper end carries a seal 293 surrounding the shaft 142 to prevent oil leakage. Oil is scavenged from this housing through the tube 288. A second housing 294 surrounds housing 290 and is similarly shaped, its open upstream end being close to the upstream end of the inner housing. Ram air enters an inlet 296 and reaches housing 294 through a duct 298. A vent pipe 300 within duct 298 vents inner housing 290. Ducts 288 and 298 extend through hollow vanes 302 in the annular discharge duct 150 for the turbine.

The inlet side of the first stage turbine disc may have a windage cover 304 over the ends of the holding bolts 196 and similar windage covers 305 may be fitted over the ends of the clamping bolts 98 and 158 for the compressor sections. Each of these covers is in the form of a hollow annulus 306, Fig. 10, which covers the bolt ends and the clamping nuts thereon. In the case of the compressor covers the edges of the annulus fit between spaced flanges 307 and 308 on the endmost compressor disc. The covers are held in place by screws 310 fitting in the ends of the through bolts.

The power plant may be started by starting the outer spool with the inner or low pressure spool allowed to windmill as a result of the flow of gas through the unit. For the purpose of starting the outer spool, a motor 312 may be carried by an accessory bracket 314 in which is journalled a shaft 316. The motor shaft 318 engages splines in one end of the shaft 316 which carries a gear 320 meshing with a gear 322 on one of the accessory drive shafts 176 (Fig. 4). With this starting arrangement the starting motor is required to spin only the outer spool and accordingly much less starting power is required than would be the case if the entire unit were driven by the starter. It has been found that, in a unit of the type described, the outer spool will operate by itself when the inner or low pressure spool is either stationary or windmilling.

Figures 10, 11:
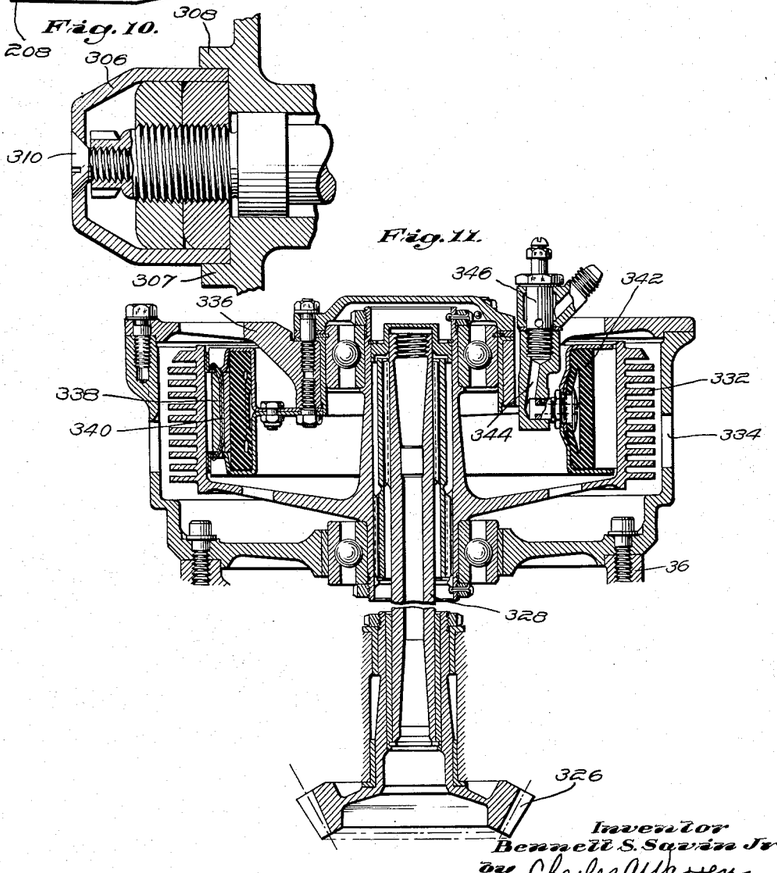
Fig. 10 is a fragmentary detail of one of the windage covers.
Fig. 11 is a fragmentary sectional view of the brake assembly.

In certain instances, as for example if the aircraft is on the ground or on a carrier deck, it may be advantageous to prevent windmilling of the propeller while the engine is idling. To accomplish this, the inner spool may have a brake applied thereto, as best shown in Fig. 11. As shown in Figs. 2 and 11, certain of the accessories are driven from the inner spool which carries a driving gear 324 in mesh with a series of gears 326 on radially extending drive shafts 328 extending through the hollow vanes 37. One of these accessories shafts may drive the scavenge and oil pressure pumps 330, Fig. 2, and another shaft may be arranged to drive other accessories through similar gearing shown at the top of Fig. 2.

As shown in Fig. 11, another one of the radially extending driving shafts 328 carries at its outer end a brake drum 332 in a housing 334 mounted on the outer sleeve 36 of the compressor inlet. This housing has a cap 336 which supports a series of brake shoes 338 normally held, as by a spring 340, out of contact with the brake drum and moved into contact with the drum by means of an inflatable tube 342. Fluid for expanding the tube is admitted through a duct 344 from a suitable source, the supply being controlled as by manual valve 346. Thus with the power plant stopped the brake may be energized to hold the inner spool from rotating while the power plant is being started, or when the power plant is idling the propeller may be feathered and the brake applied for the purpose of stopping the rotation of the inner spool. In a multiengine installation the brake may also be advantageous for preventing windmilling of the propeller in the event that the power plant is stopped in flight.

It is to be understood that the invention is not limited to the specific embodiment herein illustrated and described, but may be used in other ways without departure from its spirit as defined by the following claims.

I claim:

1. In a gas turbine power plant, a multistage compressor having at least two independently rotatable high and low pressure rotors, a multistage turbine having at least two independently rotatable rotors, one turbine rotor being connected to each compressor rotor, a supporting frame for the power plant, bearings carried by said supporting frame for separately and independently supporting each compressor rotor at opposite ends and its associated turbine at one side thereof, and mounting means for said bearings extending between the supporting frame and the bearings.

2. In a gas turbine power plant, a multistage compressor having two independently rotatable high and low pressure rotors in axial alignment, a multistage turbine having two independently rotatable high and low pressure rotors, the high pressure compressor and turbine rotors being connected together to form a rotatable unit and the low pressure compressor and turbine rotors being connected together to form a separately rotating unit, a supporting frame for the power plant including the compressor casing, and at least three spaced bearings carried by the supporting frame for supporting the high pressure turbine and compressor rotor unit within the supporting frame and three other spaced bearings carried by the supporting frame for supporting the other compressor and turbine rotor unit independently of the high pressure rotor unit.

3. In a gas turbine power plant, a multistage compressor having two independently rotatable high and low pressure rotors in axial alignment, each rotor having a number of rows of blades thereon, a multistage turbine having two independently rotatable high and low pressure rotors, the high pressure compressor and turbine rotors being connected together to form a rotatable spool, the low pressure compressor and turbine rotors being also connected together to form a second spool, the first spool surrounding the second spool and being concentric therewith, a supporting frame for the power plant, said supporting frame having rows of stator vanes therein alternating with the rows of blades on each of the rotors, bearings carried by said frame for supporting the high pressure spool and other bearings carried by said supporting frame for separately supporting the other spool, one bearing for the high pressure spool being positioned adjacent to and upstream of the high pressure turbine rotor, and one bearing for the low pressure spool being located adjacent to and downstream of the low pressure turbine rotor.

4. In a gas turbine power plant, a multistage compressor having two independently rotatable high and low pressure rotors in axial alignment, a multistage turbine having two independently rotatable high and low pressure rotors, the high pressure compressor and turbine rotors being connected together to form a rotatable spool, the low pressure compressor and turbine rotors being also connected together to form a second spool, the first spool surrounding the second spool and being concentric therewith, a supporting frame for the power plant, bearings carried by the supporting frame for supporting the high pressure spool at the upstream and downstream ends of the high pressure compressor rotor and the upstream side of the high pressure turbine rotor and other bearings, also carried by the supporting frame, for supporting the other spool at the upstream and downstream ends of the low pressure compressor rotor and on the downstream side of the turbine rotor.

5. In a gas turbine power plant, a multistage compressor having at least two independently rotatable high and low pressure rotors each having rows of blades thereon, a casing surrounding said rotors and having rows of stator vanes therein cooperating with the blades on said rotors, a diffuser section having inner and outer walls diverging in a downstream direction and located on the downstream end of said casing and into which air from the compressor is discharged, said walls being connected to said casing, a combustor at the downstream end of the diffuser and having a peripheral shell connected to the diffuser, a multistage turbine at the downstream end of the combustor, said turbine having at least two independently rotatable high and low pressure rotors each having at least one row of blades thereon, a turbine casing surrounding said turbine rotor and having rows of stator vanes therein cooperating with the blades on said rotors, each turbine rotor being connected to a corresponding compressor rotor to form independently rotating spools, said compressor casing, diffuser, combustor shell and turbine casing being connected together and forming at least a part of a supporting frame for the power plant, bearings carried by said supporting frame for separately and individually supporting each compressor rotor with its associated turbine rotor, and mounting means for said bearings extending between the supporting frame and the bearings, said mounting means including a frusto-conical support connected to the inner wall of the diffuser and extending toward the turbine, the turbine end of the support carrying one of the bearings adjacent to the turbine.

6. In a gas turbine power plant, a multistage compressor having at least two independently rotatable high and low pressure rotors each having rows of blades thereon, a casing surrounding said rotors and having rows of stator vanes therein cooperating with the blades on said rotors, a diffuser section having inner and outer walls diverging in a downstream direction and located on the downstream end of said casing and into which air from the compressor is discharged, said walls being connected to said casing, a combustor at the downstream end of the diffuser and having a peripheral shell connected to the diffuser, a multistage turbine at the downstream end of the combustor, said turbine having at least two independently rotatable high and low pressure rotors each having at least one row of blades thereon, a turbine casing surrounding said turbine rotor and having rows of stator vanes therein cooperating with the blades on said rotors, each turbine rotor being connected to a corresponding compressor rotor to form independently rotating spools, said compressor casing, diffuser, combustor shell and turbine casing being connected together and forming at least a part of a supporting frame for the power plant, at least three spaced bearings carried by the supporting frame for supporting each of the spools, and mounting means for said bearings extending between the supporting frame and the bearings, said mounting means including a frusto-conical support connected to the inner wall of the diffuser and extending toward the turbine, the turbine end of the support carrying one of the bearings adjacent to the turbine.

7. In a gas turbine power plant, a multistage compressor having two independently rotatable high and low pressure rotors in axial alignment, each rotor having rows of blades thereon, a casing surrounding said rotor and having rows of stator vanes therein cooperating with the blades on said rotors, a diffuser section having inner and outer walls diverging in a downstream direction and located on the downstream end of said casing and into which air from the compressor is discharged, said walls being connected to said casing, a combustor at the downstream end of the diffuser and having a peripheral shell connected to the diffuser, a multistage turbine at the downstream end of the combustor, said turbine having two independently rotatable high and low pressure rotors in axial alignment, each rotor having at least one row of blades thereon, a turbine casing surrounding said turbine rotor and having rows of stator vanes therein cooperating with the blades on said rotors, the high pressure compressor and turbine rotors being connected together to form a rotatable spool, the low pressure compressor and turbine rotors being also connected together to form a second spool, the first spool surrounding the second spool and being concentric therewith, said compressor casing, diffuser, combustor shell and turbine casing being connected together to form at least a part of a supporting frame for the power plant, bearings carried by the supporting frame for supporting the high pressure spool at the upstream and downstream ends of the high pressure compressor rotor, and at the upstream side of the high pressure turbine rotor, and other bearings also carried by the supporting frame for supporting the other spool at the upstream and downstream ends of the low pressure compressor rotor and on the downstream side of the turbine rotor.

8. In a gas turbine power plant, a multistage compressor having two independently rotatable high and low pressure rotors in axial alignment, each rotor having rows of blades thereon, a casing surrounding said rotor and having rows of stator vanes therein cooperating with the blades on said rotors, a diffuser section having inner and outer walls diverging in a downstream direction and located on the downstream end of said casing and into which air from the compressor is discharged, said walls being connected to said casing, a combustor at the downstream end of the diffuser and having a peripheral shell connected to the diffuser, a multistage turbine at the downstream end of the combustor, said turbine having two independently rotatable high and low pressure rotors in axial alignment, each rotor having at least one row of blades thereon, a turbine casing surrounding said turbine rotor and having rows of stator vanes therein cooperating with the blades on said rotors, the high pressure compressor and turbine rotors being connected together to form a rotatable spool, the low pressure compressor and turbine rotors being also connected together to form a second spool, the first spool surrounding the second spool and being concentric therewith, said compressor casing, diffuser, combustor shell and turbine casing being connected together to form at least a part of a supporting frame for the power plant, bearings carried by the supporting frame for supporting the high pressure spool at the upstream and downstream ends of the high pressure compressor rotor, and at the upstream side of the high pressure turbine rotor, and other bearings also carried by the supporting frame for supporting the other spool at the upstream and downstream ends of the low pressure compressor rotor and on the downstream side of the turbine rotor, the bearing on the upstream side of the high pressure turbine rotor being supported by a frusto-conical support connected to the inner wall of the diffuser and extending toward the turbine with the bearing mounted at the turbine end of the support.

References Cited in the file of this patent

UNITED STATES PATENTS

| | | |
|---|---|---|
| Re. 23,198 | Anxionnaz et al. | Feb. 21, 1950 |
| 2,238,905 | Lysholm | Apr. 22, 1941 |
| 2,318,905 | Traupel | May 11, 1943 |
| 2,423,183 | Forsyth | July 1, 1947 |
| 2,476,179 | Cameron | July 12, 1949 |
| 2,486,672 | Notestein et al. | Nov. 1, 1949 |
| 2,488,867 | Judson | Nov. 22, 1949 |
| 2,488,875 | Morley | Nov. 22, 1949 |
| 2,490,784 | Davenport | Dec. 13, 1949 |
| 2,494,821 | Lombard | Jan. 17, 1950 |
| 2,528,635 | Bell et al. | Nov. 7, 1950 |
| 2,529,973 | Sédille et al. | Nov. 14, 1950 |
| 2,547,660 | Prince | Apr. 3, 1951 |
| 2,587,057 | McVeigh | Feb. 26, 1952 |
| 2,608,821 | Hunsaker | Sept. 2, 1952 |
| 2,625,790 | Petrie | Jan. 20, 1953 |
| 2,676,459 | Marchant | Apr. 27, 1954 |

FOREIGN PATENTS

| | | |
|---|---|---|
| 629,920 | Great Britain | Sept. 30, 1949 |